(12) United States Patent
Greenberg

(10) Patent No.: US 7,236,500 B1
(45) Date of Patent: Jun. 26, 2007

(54) DEMODULATION OF MULTI-USER, MULTI-PROTOCOL DATA IN A RECONFIGURABLE DATAPATH

(75) Inventor: Craig B. Greenberg, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 09/742,811

(22) Filed: Dec. 19, 2000

(51) Int. Cl.
*H04J 3/16* (2006.01)

(52) U.S. Cl. ............... 370/466; 370/238; 370/328; 370/335

(58) Field of Classification Search ........... 370/466, 370/238, 328, 329, 335, 342, 341, 431, 441; 340/438; 455/552
See application file for complete search history.

(56) References Cited

U.S. PATENT DOCUMENTS

| | | | | |
|---|---|---|---|---|
| 5,546,211 | A * | 8/1996 | Devon | 398/98 |
| 5,764,687 | A * | 6/1998 | Easton | 375/147 |
| 6,006,105 | A * | 12/1999 | Rostoker et al. | 455/552.1 |
| 6,092,174 | A * | 7/2000 | Roussakov | 712/15 |
| 6,122,311 | A * | 9/2000 | Watanabe et al. | 375/147 |
| 6,128,329 | A * | 10/2000 | Takakusaki | 375/140 |
| 6,144,641 | A * | 11/2000 | Kaplan et al. | 370/238 |
| 6,188,679 | B1 * | 2/2001 | Sato | 370/335 |
| 6,188,682 | B1 * | 2/2001 | Takagi et al. | 370/342 |
| 6,195,585 | B1 * | 2/2001 | Karunasiri et al. | 607/57 |
| 6,198,942 | B1 * | 3/2001 | Hayashi et al. | 455/552.1 |
| 6,208,683 | B1 * | 3/2001 | Mizuguchi et al. | 375/140 |
| 6,223,274 | B1 * | 4/2001 | Catthoor et al. | 712/34 |
| 6,266,365 | B1 * | 7/2001 | Wang et al. | 375/150 |
| 6,282,234 | B1 * | 8/2001 | Kameno et al. | 375/148 |
| 6,356,581 | B1 * | 3/2002 | Nguyen et al. | 375/148 |
| 6,366,606 | B1 * | 4/2002 | Sriram | 375/150 |
| 6,515,979 | B1 * | 2/2003 | Nakayasu | 370/342 |
| 6,603,394 | B2 * | 8/2003 | Raichle et al. | 340/438 |
| 6,621,980 | B1 * | 9/2003 | Gould et al. | 386/69 |
| 6,650,694 | B1 * | 11/2003 | Brown et al. | 375/150 |
| 6,704,345 | B1 * | 3/2004 | Uesugi | 375/133 |
| 6,708,769 | B2 * | 3/2004 | Haugen et al. | 166/384 |
| 6,791,964 | B1 * | 9/2004 | Hwang et al. | 370/342 |
| 6,807,155 | B1 * | 10/2004 | Subramanian | 370/252 |
| 6,816,541 | B1 * | 11/2004 | Schmidl | 375/148 |
| 6,865,218 | B1 * | 3/2005 | Sourour | 375/148 |

OTHER PUBLICATIONS

"Chamelon's Reconfigurable Communications Process" Basic Architecture, by Brandon Eames, Aug. 18, 2000 http://64.233.161.104/search?q=cache:M251_EGSLB0J:www.isis.vanderbilt.edu/project/core.*

* cited by examiner

*Primary Examiner*—Wing Chan
*Assistant Examiner*—Andrew C. Lee

(57) ABSTRACT

A system and method of demodulating antenna data containing multiple signals in multiple protocols for multiple users is disclosed. The method comprises buffering the antenna data with an input buffer of the demodulation system. Next, the protocol to be demodulated is determined and a dynamically reconfigurable datapath for the system is configured for that protocol. The antenna data containing multiple signals is read from the input buffer, demodulated by the datapath, and stored in an output buffer. The next protocol to be demodulated is determined and the datapath is configured appropriately. Again, the signal for each of the users is demodulated by the datapath and the output data is stored in the output buffer. This process continues until all of the signals for all of the users have been demodulated for all of the prescribed protocols.

5 Claims, 3 Drawing Sheets

DEMODULATION OF MULTI-USER, MULTI-PROTOCOL DATA IN A RECONFIGURABLE DATAPATH

BACKGROUND OF THE INVENTION

1. Field of Invention

The present invention generally relates to a method and system for demodulating data and more particularly to a method and system utilizing the capabilities of a reconfigurable datapath for the demodulation of antenna data containing information in multiple protocols.

2. Status of the Prior Art

Currently, wireless communication systems, such as CDMA, are based upon multiple users sharing a common spectrum. The data for the different users may be coded according to different standards (different protocols). The base stations for the wireless communication system receive the data for all of the users through a common input. Each base station demodulates the data with decoding techniques corresponding to the coding defining the standard that separates the multiple users.

In order to properly demodulate the data, the wireless communication base station uses specialized hardware for each algorithm and protocol in the demodulation process. Multiple users and multiple protocols are accommodated by running specialized hardware in parallel. Dedicated hardware for each protocol runs a respective algorithm to demodulate the data. The hardware for each protocol are run in parallel to demodulate the data from the common input.

The use of specialized hardware for the demodulation of each protocol adds considerable expense to the system. The dedicated hardware must be designed, tested and fabricated for each protocol. Additionally, the size of the system will increase as each piece of hardware is added for each protocol to be demodulated. The adaptability of the system is also compromised due to the fact that new hardware must be designed and installed in order to implement new protocols.

The present invention addresses the above-mentioned deficiencies in prior art systems by providing a method and system of demodulating data from multiple users using multiple protocols defined in multiple standards with a dynamically reconfigurable datapath. The present invention provides a method and system whereby data for multiple users using multiple protocols (standards) is demodulated by using dynamically reconfigurable hardware with repeatedly read-buffered data antenna input data.

BRIEF SUMMARY OF THE INVENTION

A system and method of demodulating antenna data containing information from multiple users in multiple protocols is disclosed. The method comprises buffering antenna data with an input buffer of the demodulation system. Next, the protocol to be demodulated is determined and a reconfigurable datapath for the system is configured for that protocol. The data for each of the users is read from the input buffer, demodulated by the datapath, and stored in an output buffer. The next protocol to be demodulated is determined and the datapath is configured appropriately. Again, the data for each of the users is demodulated by the datapath and stored in the output buffer. This process continues until all of the data has been demodulated for all of the prescribed protocols. After all of the data has been demodulated, new data for multiple users may be received by the input buffer and the process may proceed again. In accordance with the present invention, the datapath may be a reconfigurable communications processor that is capable of being configured for multiple protocols.

In accordance with the present invention, there is provided a system for demodulating data in a plurality of protocols for multiple users. The system comprises an input buffer for receiving the antenna data containing transmissions of multiple users. Additionally, the system comprises a dynamically reconfigurable datapath operative to demodulate the signal from each user contained in the antenna data. A controller is in electrical communication with the datapath and is operative to configure the datapath for another protocol after the data of each of the users has been demodulated. An output buffer stores the data from the datapath after demodulation.

The input buffer is operative to repeatedly present the antenna data of the users to the datapath after each reconfiguration by the controller. In this respect, the signal for each of the users is demodulated by the datapath such that all of the signals are demodulated for all of the protocols. The datapath may be a communications processor operative to demodulate data for wireless communications. The input and output buffers may be memory devices.

BRIEF DESCRIPTION OF THE DRAWINGS

These, as well as other features of the present invention will become more apparent upon reference to the drawings wherein.

DETAILED DESCRIPTION OF THE INVENTION

Figure 1:
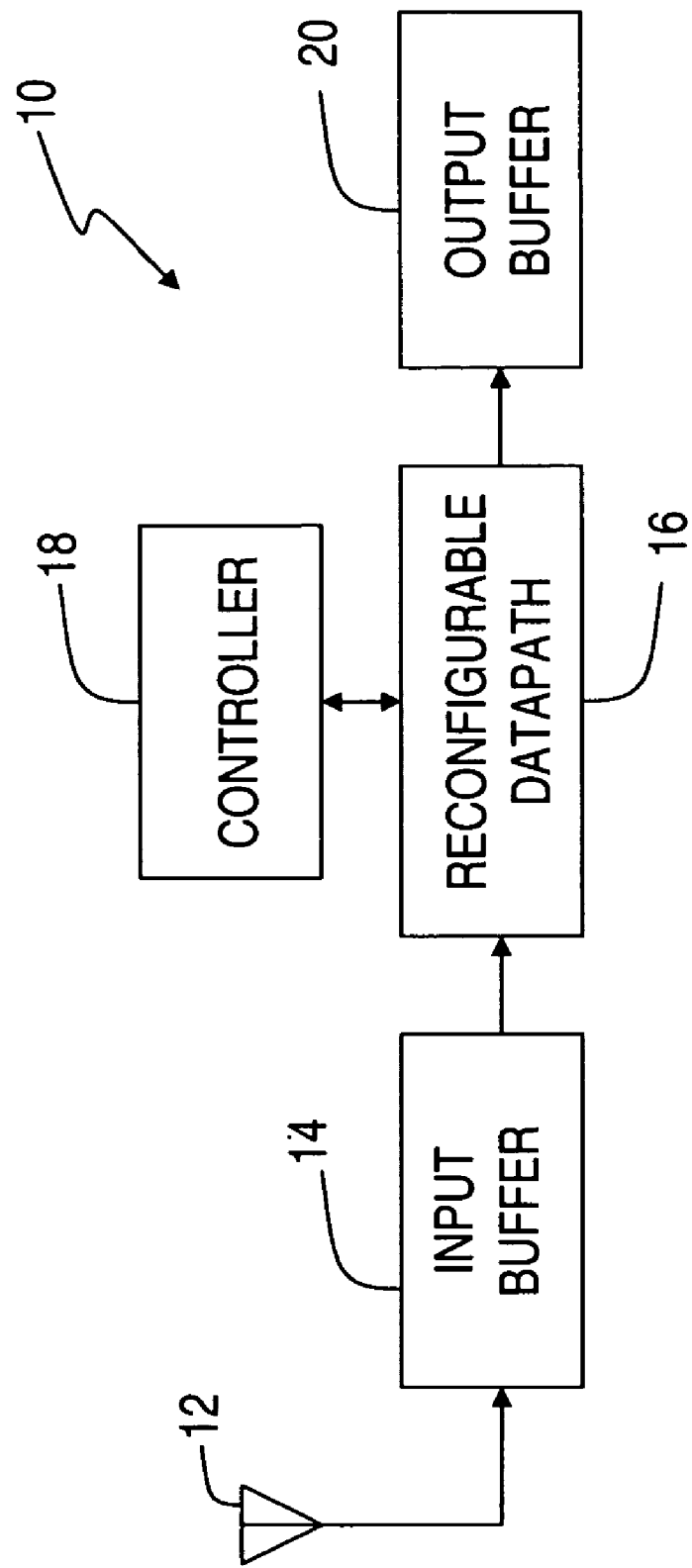
FIG. 1 is a block-diagram illustrating a system for demodulating signals from multiple users transmitted with multiple protocols (standards) constructed in accordance to the present invention.

Referring now to the drawings wherein the showings are for purposes of illustrating a preferred embodiment of the present invention only, and not for purposes of limiting the same, FIG. 1 illustrates a demodulation system 10 constructed in accordance with the present invention. The demodulation system 10 has a receiver 12 such as a radio receiver and antenna that is capable of receiving data such as wireless communications and control signals for a cellular phone system. Alternatively, the receiver 12 may receive data from a wired network. In either instance, the receiver 12 is operative to present data in multiple protocols from multiple users. The data from the receiver 12 will contain signals with different protocols (standards) depending on the type and manner of encoding. In order to demodulate or decode the data, a specific algorithm must be performed on the antenna data for the desired signal. As previously mentioned, the typical approach is for specialized hardware to demodulate the data for each protocol. For antenna data containing signals with multiple protocols (standards), the antenna data is demodulated multiple times for each input data set for each protocol. Therefore, in the prior art, it is necessary to use specialized hardware for each protocol to be demodulated.

Referring to FIG. 1, the data from the receiver 12 is fed to an input buffer 14 that is operative to receive and store the antenna data containing data from multiple users in multiple protocols (standards). The input buffer 14 is a memory device operative to store the antenna data multiple times for each input data set for each protocol and output the data in a first in-first out sequence.

The input buffer 14 is in electrical communication with a dynamically reconfigurable datapath 16 that demodulates the data. Specifically, datapath 16 may be a dynamically reconfigurable communications processor that is capable of reconfiguring thereof for sequential processing of multiple algorithms. An example of a reconfigurable datapath contemplated for use in the present invention is the Reconfigurable Communications Processor manufactured by Chameleon Systems, Inc. of San Jose, Calif. The datapath 16 is operated by a controller 18 that configures the datapath 16 for processing. The controller 18 contains software that instructs the datapath 16 to change its configuration for the protocol being demodulated. In this respect, the circuitry of the reconfigurable datapath 16 will be changed according to the protocol being demodulated.

The datapath 16 outputs demodulated data to an output buffer 20. As seen in FIG. 1, the output buffer 20 is in electrical communication with the datapath 16 such that the demodulated data can be stored for later retrieval. The demodulated data stored on the output buffer 20 can then be retrieved by hardware external to the demodulation system 10.

Figure 3:
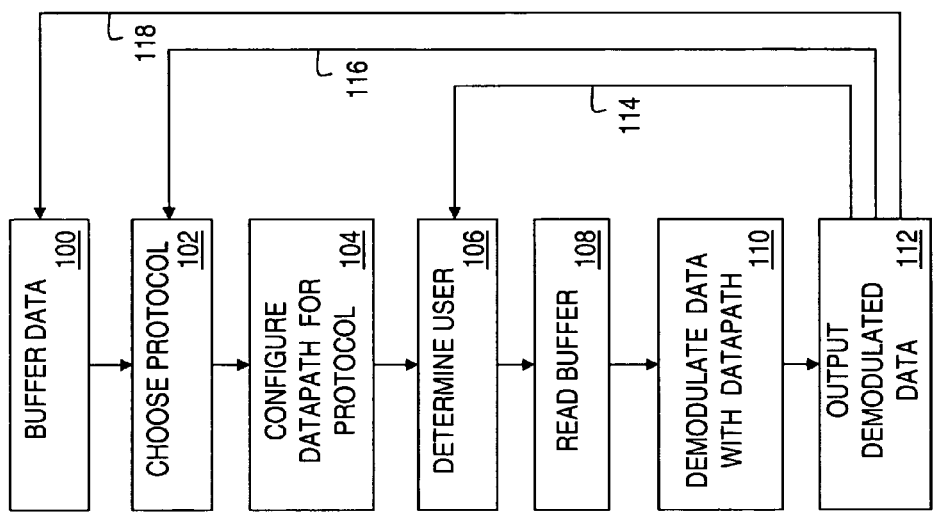
FIG. 3 is a flow chart illustrating the method of demodulating data in accordance with the present invention.

Referring to FIG. 3, a method of demodulating data with the demodulation system 10 is illustrated. The method begins with step 100 wherein the data is buffered. Specifically, the data (i.e., antenna data) from the receiver 12 is fed into the input buffer 14. As previously mentioned, the data will contain signals from multiple users transmitted in multiple protocols (standards). The next step is to select the protocol to be demodulated as seen in step 102 of FIG. 3. The controller 18 may determine the protocol to be demodulated based upon the type of data encoding. Once the protocol is selected, datapath 16 will be configured, as seen in step 104, to demodulate the data according to the algorithm for the selected protocol. Accordingly, controller 18 will configure the datapath 16 to demodulate and decode the data according to the selected protocol.

Next, the data of the user, or users, is determined. As mentioned above, each user will have a signal in the antenna data. The user, or users, will be chosen in step 106 and the antenna data associated therewith will be read from the input buffer 14 as seen in step 108. The datapath 14 will demodulate the signal of the user in step 110. The signal will be demodulated according to the configuration of the datapath 16 chosen in step 102. Once the data has been demodulated, the data will be outputted to the output buffer 20, as seen in step 112. The demodulated data will be stored in the output buffer 20 for retrieval.

Once the data for a first user or first set of users has been demodulated, the data for a second and subsequent users can also be demodulated. Specifically, as seen in step 112 of FIG. 3, after the data for a particular user has been demodulated and sent to the output buffer 20, the next user is determined by returning to step 106 via pathway 114. The data for the next user is determined in step 106 and read from input buffer 14 in step 108. The data is demodulated with the datapath 16 in step 110 and sent to the output buffer 20 in step 112. The process continues until all of the signals for all of the users have been demodulated by the datapath 16 for the protocol selected in step 102.

After the signal for each user has been demodulated by the datapath 16 for the selected protocol, the next protocol is selected. Specifically, as seen in FIG. 3, after all the signals for each user have been demodulated and outputted for the selected protocol, the method continues along pathway 116 by selecting the next protocol in step 102. Once the next protocol has been selected, the datapath 16 will be configured in step 104 for that protocol. The signals for each of the users will then be demodulated according to steps 106 to 112, as previously mentioned.

After the signals for each of the users have been demodulated for each of the protocols, the method of demodulating data according to the present invention proceeds by buffering new data. Specifically, antenna data for users from receiver 12 will be buffered in step 100 by proceeding along pathway 118. New antenna data for the users will be demodulated for multiple protocols using the steps previously described. In this respect, the method for demodulating data will proceed through steps 100 to 112 for the signal of each and every user, and each and every protocol, as previously described.

It will be recognized that the system and method for demodulating data is more efficient than prior art systems because the datapath 16 is dynamically reconfigured for each protocol. The antenna data for each user is fed into the datapath 16 multiple times for demodulation by each protocol. Accordingly, only a single datapath 16 is necessary to implement multiple protocols rather than multiple application specific hardware.

Figure 2:
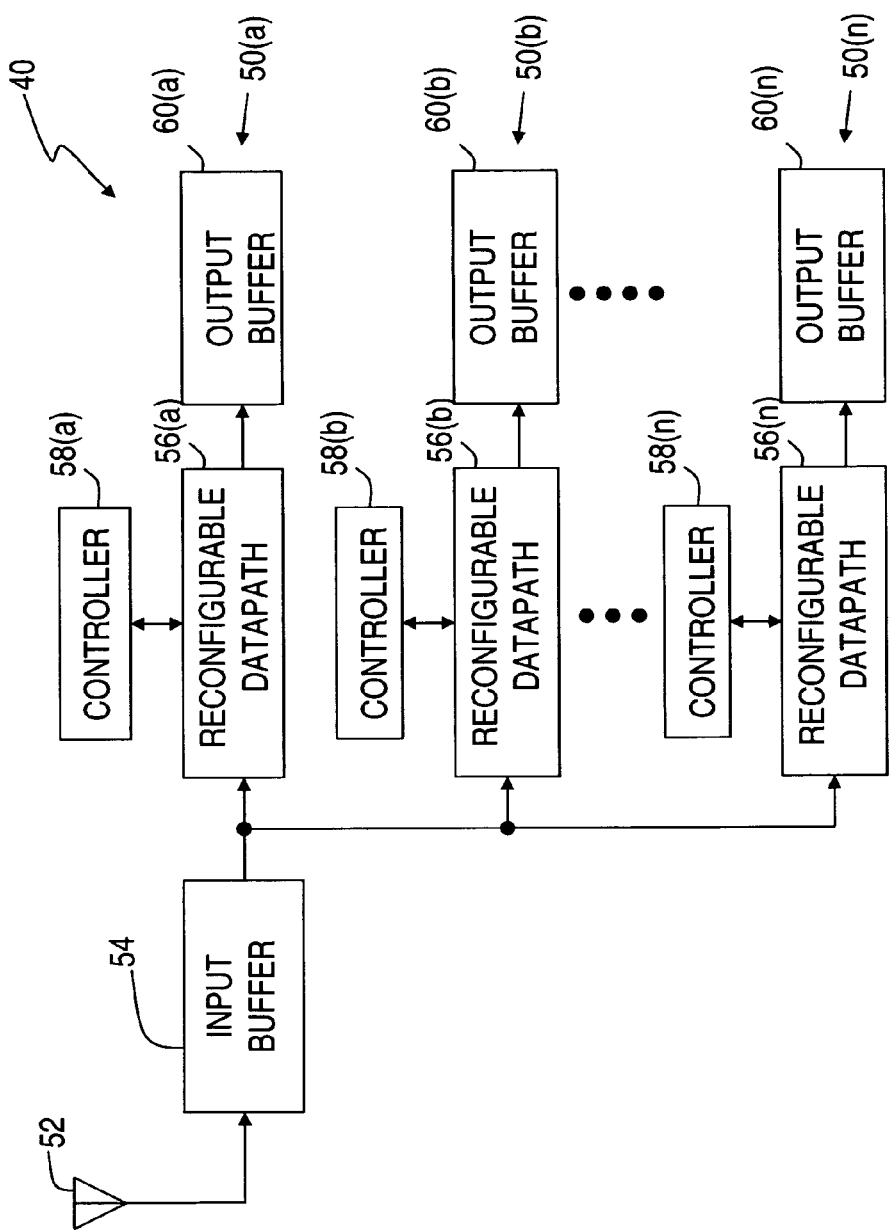
FIG. 2 is a block-diagram illustrating a second system for demodulating data in parallel for multiple users.

Referring to FIG. 2, a parallel demodulation system 40 is shown in which multiple single demodulation systems $50(a), 50(b) \ldots 50(n)$ are arrayed in parallel. The parallel demodulation system 40 is operative to reduce processing time by utilizing multiple demodulation systems $50(a), 50(b) \ldots 50(n)$ to process the antenna data. Each of the demodulation systems $50(a), 50(b) \ldots 50(n)$ are connected to receiver 52 and input buffer 54 for inputting data into each system. Receiver 52 and input buffer 54 are similar to respective receiver 12 and input buffer 14 of the single demodulator system 10. As seen in FIG. 2, a first demodulation system $50(a)$ comprises a controller $58(a)$, a reconfigurable datapath $56(a)$ and an output buffer $60(a)$. The demodulation system $50(a)$ is similar to the demodulation system 10, previously described. In order to form the parallel demodulation system 40, second and subsequent demodulation systems (i.e., $50(b) \ldots 50(n)$) are cascaded. Specifically, the second demodulation system $50(b)$, as well as subsequent demodulation systems (i.e., $50(n)$) have their own controllers $58(b) \ldots 58(n)$, reconfigurable datapaths $56(b) \ldots 56(n)$ and output buffers $60(b) \ldots 60(n)$, as seen in FIG. 2. As such it is possible for each of the demodulation systems $50(a) \ldots 50(n)$ to demodulate data for multiple users.

Specifically, during demodulation of data, a prescribed number of users will be allocated to each of the demodulation systems $50(a \ldots 50(n)$ in order to facilitate demodulation of the data. Each of the demodulation systems $50(a \ldots 50(n)$ will demodulate the data for the assigned users according to the method described above for the single demodulation system 10. Accordingly, it is possible for the demodulation systems $50(a \ldots 50(n)$ to operate in parallel in order to demodulate the signal of multiple users.

Additional modifications and improvements of the present invention may be apparent to those of ordinary skill in the art such as having each datapath in the multiple demodulation system 40 implement a different protocol. Thus, the particular combination of parts described and illustrated herein is intended to represent only a certain embodiment of the present invention only, and is not intended to serve as a limitation of alternative devices within the spirit and scope of the invention.

The invention claimed is:

1. A method to demodulate a signal comprising:
   receiving modulated data by an antenna;
   storing the received modulated data in a buffer;
   configuring a first datapath from several predefined configurations, wherein a type of data encoding for the received modulated data stored in the buffer for a first user establishes a protocol that determines a configuration for the first datapath;
   configuring a second datapath from the several predefined configurations based on a protocol for the type of data encoding for the received modulated data stored in the buffer for the second user; and
   operating the first and second datapaths in parallel to demodulate the received modulated data of the first user and the second user.

2. The method of claim 1 wherein configuring the first datapath further includes using a first controller to provide the configuration selected for the first datapath and configuring the second datapath includes using a second controller to provide the configuration selected for the second datapath.

3. The method of claim 1 further including using a first output buffer coupled to the first datapath and a second output buffer coupled to the second datapath to store data for the first user and the second user.

4. A system for demodulating signals comprising:
   an antenna;
   first and second datapaths coupled to the antenna;
   an input buffer to store the data received by the antenna and provide the data to the first datapath and to the second datapath; and
   a first controller to select a protocol and configure the first datapath to accept modulated data from the antenna and provide demodulated data in accordance with the protocol and a second controller to configure the second datapath to operate in parallel with the first datapath.

5. The system of claim 4 further including a first output buffer for storing the demodulated data from the first datapath and a second output buffer coupled to the second datapath.

* * * * *